United States Patent
Osawa et al.

(10) Patent No.: US 8,561,775 B2
(45) Date of Patent: Oct. 22, 2013

(54) VEHICLE DRIVE DEVICE

(75) Inventors: Masami Osawa, Nagoya (JP); Shinichi Ito, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/500,256

(22) PCT Filed: Nov. 17, 2010

(86) PCT No.: PCT/JP2010/070485
§ 371 (c)(1),
(2), (4) Date: Apr. 4, 2012

(87) PCT Pub. No.: WO2011/062191
PCT Pub. Date: May 26, 2011

(65) Prior Publication Data
US 2012/0193187 A1 Aug. 2, 2012

(30) Foreign Application Priority Data

Nov. 19, 2009 (JP) ................................ 2009-263483

(51) Int. Cl.
F16D 25/12 (2006.01)
B60K 6/20 (2007.10)
B60K 6/38 (2007.10)

(52) U.S. Cl.
USPC .............. 192/85.37; 192/85.27; 192/85.61; 192/110 B; 475/5

(58) Field of Classification Search
USPC ............. 192/3.3, 85.29, 85.37, 85.27, 85.61, 192/110 B; 477/5; 475/1, 5; 180/65.21–65.26, 65.275
See application file for complete search history.

(56) References Cited

U.S. PATENT DOCUMENTS

| 7,841,457 B2 * | 11/2010 | Crafton et al. ............. 192/85.29 |
| 2007/0049445 A1 | 3/2007 | Reisch et al. |
| 2009/0100965 A1 | 4/2009 | Sanji et al. |

FOREIGN PATENT DOCUMENTS

| JP | 2006-105340 A | 4/2006 |
| JP | 2006-137406 A | 6/2006 |
| JP | 2007-062726 A | 3/2007 |
| JP | 2008-126703 A | 6/2008 |
| JP | 2009-001127 A | 1/2009 |
| JP | 2009-101730 A | 5/2009 |
| JP | 2010-006190 A | 1/2010 |

* cited by examiner

OTHER PUBLICATIONS

International Search Report (PCT/ISA/210) issued on Jan. 25, 2011, by Japanese Patent Office as the International Searching Authority for International Application No. PCT/JP2010/070485.

*Primary Examiner* — David D Le
*Assistant Examiner* — Jacob S Scott
(74) *Attorney, Agent, or Firm* — Buchanan Ingersoll & Rooney PC (57) ABSTRACT

A vehicle drive device has an engine, a transmission, a clutch device and a clutch operating mechanism which operates the clutch device to drivingly connect the engine to the transmission. The clutch operating mechanism has a clutch drum secured to the outer circumferential surface of an input shaft of the transmission and holding a second clutch section which is engageable with a first clutch section held on an input member of the clutch device to which a driving power of the engine is transmitted. The clutch drum has a drum chamber, a fixed plate closing an opening of the drum chamber, a piston surrounded by the clutch drum and partitioning the drum chamber into a hydraulic chamber and a spring chamber, and an urging element provided inside the spring chamber to be surrounded by the clutch drum and urging the piston.

10 Claims, 6 Drawing Sheets

VEHICLE DRIVE DEVICE

TECHNOLOGICAL FIELD

The present invention relates to a vehicle drive device. The present invention can be utilized in, for example, a hybrid vehicle that uses an engine and a drive motor together as vehicle driving sources, or a non-hybrid vehicle that has an engine but does not have any drive motor.

BACKGROUND ART

Patent Documents 1 and 2 disclose a vehicle drive device which has an engine, a transmission to which a driving power of an output shaft of the engine is transmitted, and a clutch device provided between the output shaft of the engine and an input shaft of the transmission. In the device, the clutch device has a first clutch section provided on the output shaft side of the engine and a second clutch section provided on the input shaft side of the transmission. The clutch device is switchable to a connection state that the first and second clutch sections are engaged to transmit the driving power of the engine to the transmission, and a cutoff state that the engagement between the first and second clutch sections is released to cut off the transmission of the driving power.

PRIOR ART DOCUMENT

Patent Documents

Patent Document 1: JP2009-101730 A
Patent Document 2: JP2006-137406 A

SUMMARY OF THE INVENTION

Problem to be Solved by the Invention

In the vehicle drive device, there is a further demand for downsizing the device in a shaft lengthwise direction.

The present invention has been made taking the foregoing circumstance into consideration, and a problem thereof is to provide a vehicle drive device that is advantageous in downsizing the device in a shaft lengthwise direction.

Measures for Solving the Problem

In order to solve the aforementioned problem, a vehicle drive device in a first aspect comprises:

an engine having an output shaft;

a transmission to which a driving power of the output shaft of the engine is transmitted and which has an input shaft with an axis and is connected to a wheel;

a clutch device provided between the output shaft of the engine and the input shaft of the transmission, having a first clutch section provided on the output shaft side of the engine and a second clutch section provided on the input shaft side of the transmission, and being switchable to a connection state that the first and second clutch sections are engaged to transmit the driving power of the engine to the transmission, and a cutoff state that the engagement between the first and second clutch sections is released to cut off the transmission of the driving power; and a clutch operating mechanism for switching the connection state and the cutoff state of the clutch device through the supply and discharge of liquid; wherein:

the clutch operating mechanism comprises a clutch drum secured to the input shaft, supporting the second clutch section and having a drum chamber; a fixed plate surrounded by the clutch drum and secured to the clutch drum to close an opening of the drum chamber; a piston surrounded by the clutch drum, partitioning the drum chamber into a hydraulic chamber for generating a hydraulic pressure that switches the clutch device from the connection state to the cutoff state, and a spring chamber, and being movable along the axis; and an urging element provided inside the spring chamber to be surrounded by the clutch drum and urging the piston to switch the clutch device from the cutoff state to the connection state;

the clutch drum comprises a cylindrical fixed portion fixed to an outer circumferential portion of the input shaft; a first extended portion extended radially outward from the fixed portion; an inner cylindrical portion formed from the first extended portion along the axis of the input shaft; a second extended portion extended radially outward from the inner cylindrical portion; and an outer cylindrical portion formed from the second extended portion along the axis of the input shaft and holding the second clutch section;

the outer cylindrical portion, the inner cylindrical portion and the second extended portion partition the drum chamber being a ring shape; and the fixed portion, the inner cylindrical portion and the first extended portion partition a ring-shaped bearing chamber in which a bearing rotatably supporting the clutch drum is arranged, wherein the drum chamber and the bearing chamber are juxtaposed in a radial direction of the input shaft with the bearing chamber arranged on the inner circumferential side than the drum chamber in the radial direction of the input shaft.

A vehicle drive device in another aspect comprises:

an input member rotatably connected to a driving source;

a shaft-like member arranged on the same axis as the input member and connected to a transmission;

a first clutch section engaged with one of the input member and the shaft-like member movably along the axis;

a second clutch section arranged to be connectable and disconnectable alternately with the first clutch section and engaged with the other of the input member and the shaft-like member movably along the axis;

a clutch drum secured to the shaft-like member, supporting the second clutch section movably along the axis, and having a bottom portion;

a plate fixed to the clutch drum;

a piston supported in the clutch drum movably along the axis for pressing the first and second clutch sections;

a spring chamber partitioned and formed between one end portion of the piston and the bottom portion of the clutch drum;

an urging member provided in the spring chamber and urging the piston toward the first and second clutch sections; and a hydraulic chamber partitioned and formed between the other end portion of the piston and the plate; wherein:

the first and second clutch sections are brought into pressure contact by a pressing force of the piston urged by the urging member;

the piston is separated by the pressure of oil supplied to the hydraulic chamber from the first and second clutch sections against an urging force of the urging member;

the clutch drum comprises a cylindrical fixed portion fixed to an outer circumferential portion of the shaft-like member; a first extended portion extended radially outward from the fixed portion; an inner cylindrical portion formed from the first extended portion along the axis of the shaft-like member; a second extended portion extended radially outward from the inner cylindrical portion; and an outer cylindrical portion formed from the second extended portion along the axis of the shaft-like member and holding the second clutch section;

the outer cylindrical portion, the inner cylindrical portion and the second extended portion partition the drum chamber being a ring shape; and the fixed portion, the inner cylindrical portion and the first extended portion partition a ring-shaped bearing chamber in which a bearing rotatably supporting the clutch drum is arranged, wherein the drum chamber and the bearing chamber are juxtaposed in a radial direction of the shaft-like member with the bearing chamber arranged on the inner circumferential side than the drum chamber in the radial direction of the shaft-like member.

FORMS FOR PRACTICING THE INVENTION

First Embodiment

Figure 1:
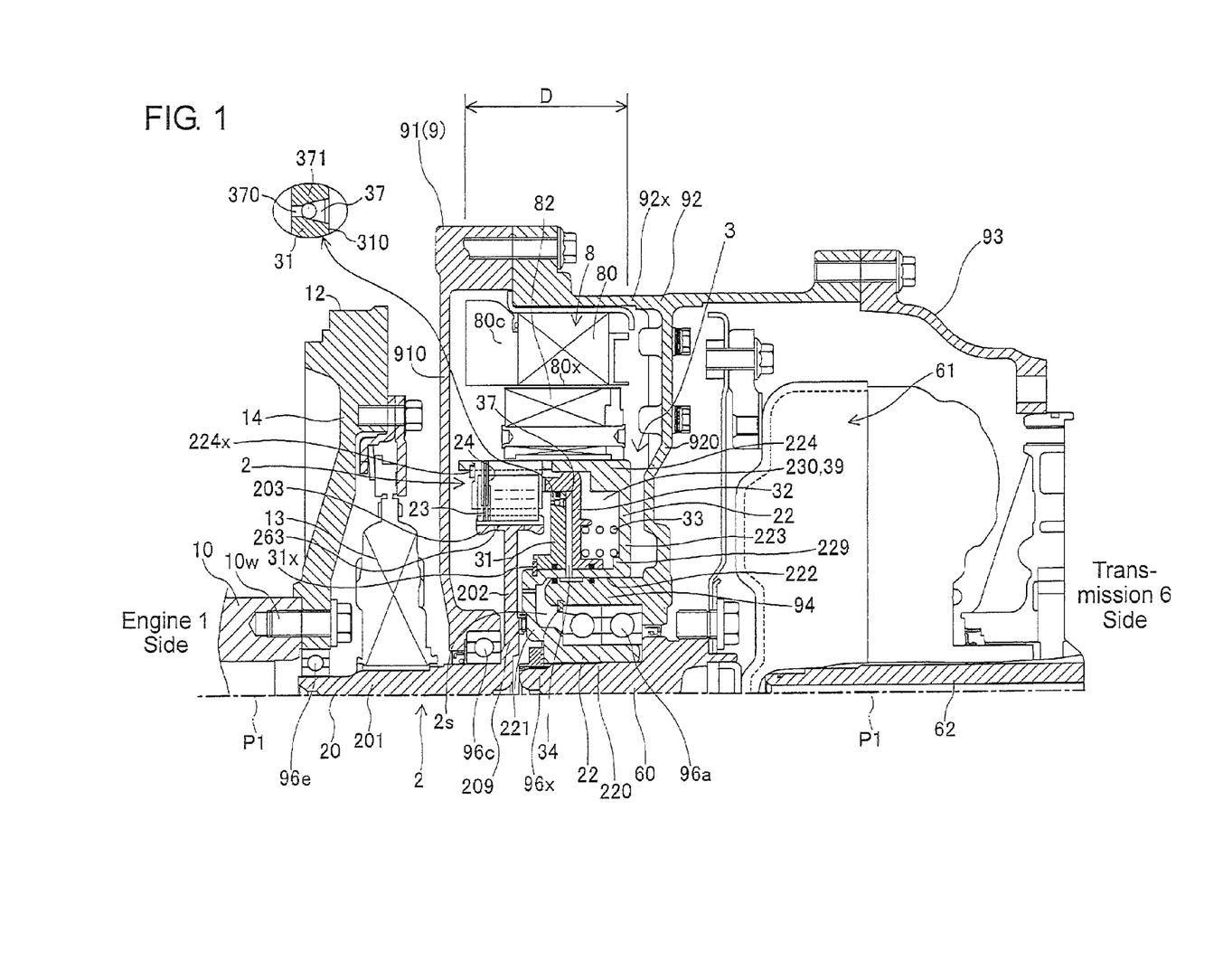
FIG. 1 relates to a first embodiment and is a sectional view showing the upper half of a vehicle drive device.
Figure 2:
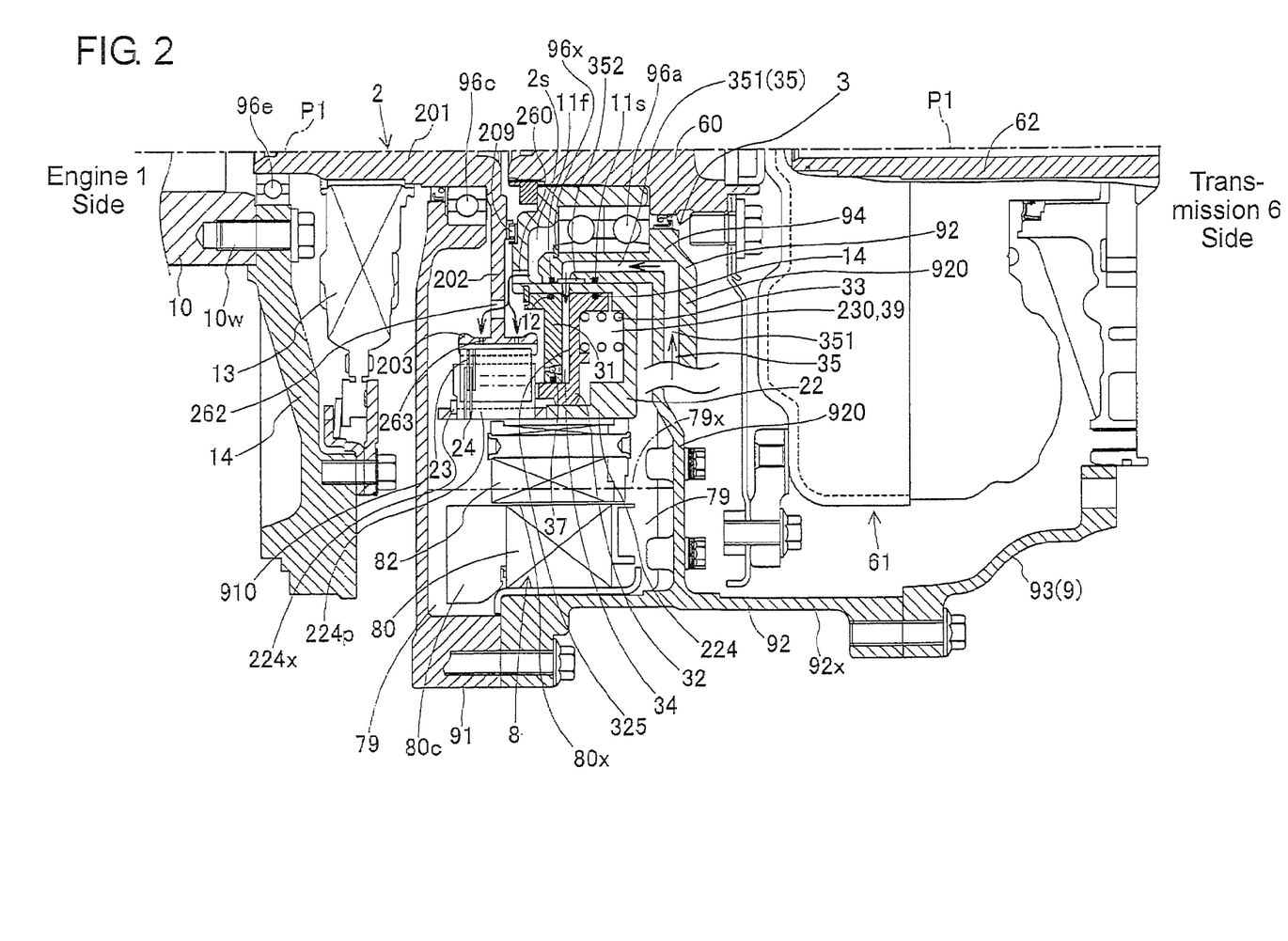
FIG. 2 relates to the first embodiment and is a sectional view showing the lower half of the vehicle drive device.
Figure 3:
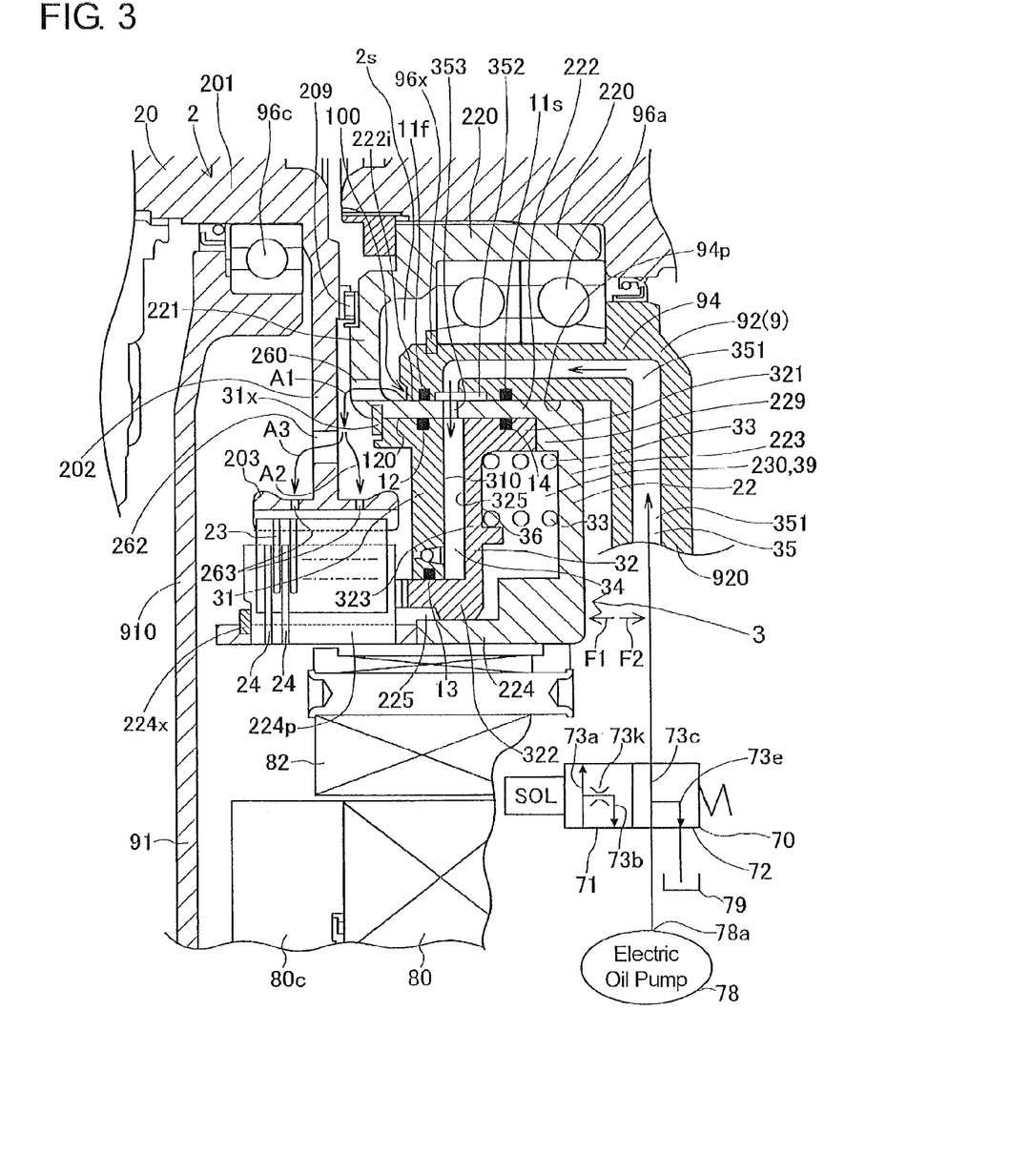
FIG. 3 relates to the first embodiment and is a fragmentary sectional view showing the neighborhood of a hydraulic chamber in the vehicle drive device.
Figure 4:
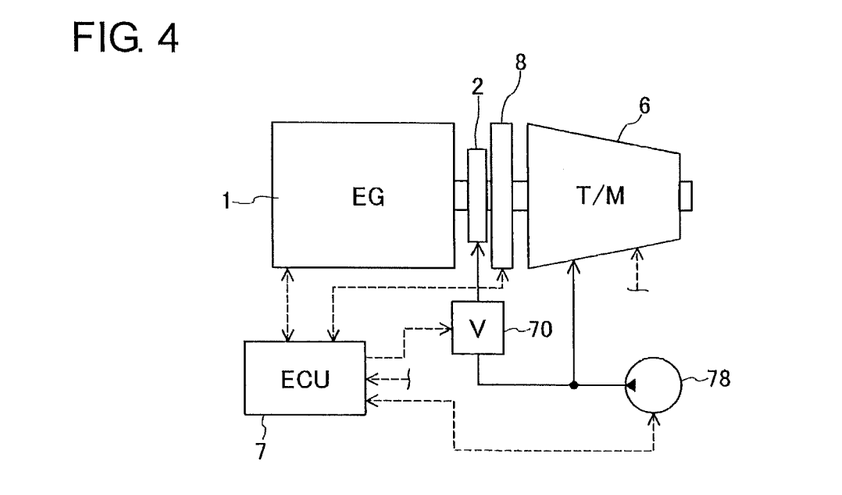
FIG. 4 relates to the first embodiment and is a system diagram showing a vehicle drive system.

The embodiments of the present invention are applied to a hybrid vehicle such as passenger car, a large-sized vehicle or the like. The drawings show a concept of the embodiments. FIG. 1 is an upper-half sectional view of a vehicle drive device, FIG. 2 is a lower-half sectional view thereof, and FIG. 3 shows an important part of the lower half in an enlarged scale. FIG. 4 is a block diagram representing a vehicle drive system. As shown in FIG. 4, the vehicle drive system has an engine 1 functioning as a first driving source, a clutch device 2, a drive motor (hereafter also referred to as motor) 8 constituted by an electric motor functioning as a second driving source, a transmission 6 and a control device 7. The control device 7 controls the engine 1, the motor 8, the transmission 6, a control valve 70 and an electric oil pump 78. The motor 8 can function as a generator that regenerates an electric energy when the vehicle is in deceleration or the like. According to the present embodiment, various constructions are taken for enhancing the efficiency in regeneration. Because of being of a motor-driven type, the oil pump 78 can perform a pumping action for supplying oil (lubrication oil) even when the engine 1 is not driven. In FIG. 4, solid-line arrows indicate hydraulic passages connected to the oil pump 78, while broken-line arrows indicate signal lines connected to the control device 7.

As shown in FIG. 1, the engine 1 has an output shaft 10 rotated by the engine 1 about an axis P1 and a flywheel 14 taking a ring shape and coaxially connected by fixtures 10w to the output shaft 10. A ring gear 12 formed on the outer circumferential portion of the flywheel 14 meshes with a drive shaft of a starter motor (not shown). As the starter motor is driven, the flywheel 14 is rotated. A torque converter 61 provided in the transmission 6 has an input shaft 60 (shaft-like member) rotated by the driving power of the output shaft 10 of the engine 1. The input shaft 60 has the axis P1 and is connected to travelling wheels through a speed change gear mechanism (not shown) in the transmission 6 to rotate the travelling wheels (not shown).

The clutch device 2 will now be described. The clutch device 2 constitutes a wet multiple-disc clutch and has an input member 20, a clutch drum 22, friction plates 23 held on the input member 20 and functioning as a first clutch section, and separate plates 24 held on the clutch drum 22 and functioning as a second clutch section. The friction plates 23 and the separate plates 24 are alternately arranged in a face-to-face relation and can be brought into an engaged state (connection state) being a pressure-contacted state that they are pressure-contacted with each other, and an engagement release (cutoff state) being a pressure-contact release that they are separated from each other.

The friction plates 23, the separate plates 24, the input member 20 and the clutch drum 22 are coaxially arranged to make a round of the axis P1 of the input shaft 60. The input member 20 is connected to the flywheel 14 through a damper 13. When the engine 1 is driven, the output shaft 10, the flywheel 14, the damper 13, the input member 20 and the friction plates 23 are rotated bodily about the axis P1. As shown in FIG. 1, the input member 20 has a shaft portion 201 arranged coaxially with the output shaft 10, a ring-shaped extended portion 202 extended radially outward from a shaft end of the shaft portion 201 on the transmission 6 side, and a ring-shaped holding portion 203 formed along the axis P1 and holding the friction plates 23. On the outer circumferential portion of holding portion 203, a plurality of the friction plates 23 are fitted to be relatively movably along the axis P1 but are restrained from relative rotation.

The clutch drum 22 has a fixed cylindrical portion 220 of a cylindrical shape spline-fitted on the outer circumferential portion of the input shaft 60 of the transmission 6 to rotate bodily with the input shaft 60, a first extended portion 221 extended radially outward from an end of the fixed cylindrical portion 220 on the engine 1 side, an inner cylindrical portion 222 formed from the outer end of the first extended portion 221 along the axis P1, a second extended portion 223 (bottom portion) extended radially outward from an end of the inner cylindrical portion 222 on the transmission 6 side, and an outer cylindrical portion 224 extended from the outer end of the second extended portion 223 toward the clutch device 2 along the axis P1. On an end portion of the outer cylindrical 224, a plurality of the separate plates 24 are fitted to be relatively movably along the axis P1 but are restrained from relative rotation. The inner cylindrical portion 222, the second extended portion 223 and the outer cylindrical portion 224 define a drum chamber 230. Here, as shown in FIG. 1, the fixed cylindrical portion 220, the inner cylindrical portion 222, the outer cylindrical portion 224 and the drum chamber 230 which constitute the clutch drum 22 are formed to make a round of the axis P1. The inner cylindrical portion 222 has a piston stopper 229.

As shown in FIG. 1, the first extended portion 221 of the clutch drum 22 is adjacent to the extended portion 202 of the input member 20 of the clutch device 2 and is in abutting contact therewith through a thrust bearing 209. Thus, the present device is advantageous in shorting the shaft lengthwise dimension. Further, springs 33, a piston 32, a fixed plate 31 and the separate plates 24 (the second clutch section) are built and received in a space surrounded by the outer cylindrical portion 224 of the clutch drum 22 in this order toward the clutch device 2 in a direction in which the axis P1 extends. That is, the springs 33, the piston 32, the fixed plate 31 and the separate plates 24 are housed in the shaft lengthwise dimension of the clutch drum 22. In this construction, the present device is advantageous in shorting the shaft lengthwise dimension in comparison with a form in which the springs 33 are arranged outside of the clutch drum 22 in series in the shaft lengthwise direction. The separate plates 24 are engaged on the outer cylindrical portion 224 of the clutch drum 22 by means of a ring-shaped engaging member 224x.

The clutch device 2 is switchable to the connection state that the driving power of the engine 1 is transmitted to the input shaft 60 of the transmission 6 and the cutoff state that the transmission of the driving power of the engine 1 is cut off. In the connection state, the adjoining friction plates 23 and separate plates 24 are mutually engaged by being pressure-contacted, so that they can transmit the driving power of the engine 1 to the input shaft 60 of the transmission 6. In the cutoff state, the adjoining friction plates 23 and separate plates 24 are released from engagement to cut off the transmission of the driving power to the transmission 6. The clutch device 2 is of a normally closed type and, in an ordinary state that the driving power of the engine 1 is transmitted to the transmission 6, is maintained in the connection state that the friction plates 23 and the separate plates 24 are pressure-contacted by the spring force of the springs 33. Thus, in the ordinary state, a hydraulic pressure is not required in particular for bringing the adjoining friction plates 23 and separate plates 24 into mutual pressure-contact, so that an advantage is obtained in expediting energy-saving. Further, even if, by any chance, the pressurized oil system falls in malfunction, the friction plates 23 and the separate plates 24 constructing the clutch device 2 are held in the connection state that they are pressure-contacted, and therefore, an advantage can be obtained in that the driving power of the engine 1 is transmitted to the transmission 6, thereby enabling the vehicle to travel.

Description will be further made regarding a clutch operating mechanism 3 that operates the clutch device 2. As shown in FIG. 3, the clutch operating mechanism 3 has the fixed plate 31 fixed on the outer circumferential side of the inner cylindrical portion 222 of the clutch drum 22 through a fixing member 31x of a C-ring shape or the like fitted in a fitting groove, the piston 32 fitted in the drum chamber 230 movably along the axis P1, the springs 33 formed as coil springs arranged between the piston 32 and the second extended portion 223 of the clutch drum 22 and functioning as an urging element, a hydraulic chamber 34 formed between a surface 310 of the fixed plate 31 on a side opposite to the clutch device 2 and a pressured surface 325 of the piston 32 on the clutch device 2 side, and a fluid passage 35 (refer to FIG. 3) communicating with the hydraulic chamber 34. The fixed plate 31 closes the space on the clutch device 2 side of the drum chamber 230. The piston 32 is provided in the drum chamber 230. Thus, the drum chamber 230 is partitioned into the hydraulic chamber 34 that is supplied with a hydraulic pressure to switch the clutch device 2 from the connection state to the cutoff state, and the spring chamber 39 receiving the springs 33 therein.

As shown in FIG. 3, the piston 32 has a movable inner cylindrical portion 321 and a movable outer cylindrical portion 322 formed coaxially with each other and a pressured portion 323 connecting the both portions in the radial direction. When the piston 32 moves in the arrow F1 direction (refer to FIG. 3; in a closing direction to bring the clutch device 2 into the connection state), the movable outer cylindrical portion 322 of the piston 32 moves the separate plates 24 of the clutch device 2 toward the friction plates 23 to bring about the pressure-contact. When the piston 32 moves in the arrow F2 direction (refer to FIG. 3; in a release direction to release the engagement of the clutch device 2), on the contrary, the movable outer cylindrical portion 322 of the piston 32 goes away from the separate plates 24 of the clutch device 2 to release the pressure contact between the separate plates 24 and the friction plates 23.

The hydraulic chamber 34, the piston 32 and the drum chamber 230 (the spring chamber 39, the hydraulic chamber 34) are ring-like formed about the axis P1 on the outer circumferential side of the axis P1. A plurality of the springs 33 are arranged around the axis P1 at almost equal intervals in the circumferential direction. As show in FIG. 3, one end of each spring 33 is seated on the second extended portion 223 of the clutch drum 22, while the other end of each spring 33 is seated on a spring receiving concave portion 36 formed on a back surface of the piston 32, so that each spring 33 is restrained from coming off. As understood from FIG. 3, the springs 33 urge the piston 32 toward the fixed plate 31 in the arrow F1 direction. Thus, when the pressurized oil is not supplied to the hydraulic chamber 34, the piston 32 is moved toward the clutch device 2 in the arrow F1 direction (the closing direction to bring the clutch device 2 into the connection state). As a result, the friction plates 23 and the separate plates 24 are mutually pressure-contacted to bring the clutch device 2 into the connection state. According to the present embodiment, at the time of regeneration, the clutch device 2 is switched from the connection state to the cutoff state, so that the power transmission between the engine 1 and the transmission 6 is cut off, thereby enhancing the efficiency in regeneration.

According to the present embodiment, when the urging force of the springs 33 overcomes the axial force with which the pressurized oil supplied to the hydraulic chamber 34 pushes the piston 32, the friction plates 23 and the separate plates 24 of the clutch device 2 are mutually pressure-contacted, whereby the clutch device 2 is kept in the connection state or the half connection state. At this time, the driving power of the output shaft 10 of the engine 1 is transmitted to the input shaft 60 of the transmission 6 through the clutch device 2.

As shown in FIG. 3, the clutch operating mechanism 3 is provided with the fluid passage 35 which communicates with the hydraulic chamber 34 for supplying and discharging oil to and from the hydraulic chamber 34. The fluid passage 35 is composed of a first fluid passage 351 formed in a fixed cylindrical portion 94 of a second case 92 being a part of a case 9 referred to later, an annular groove 352 formed annularly on the outer circumferential surface of the fixed cylindrical portion 94 to open to an end of the first fluid passage 351, and a piercing port 353 piercing through the inner cylindrical portion 222 of the clutch drum 22 in the thickness direction of the inner cylindrical portion 222 and opening to the annular groove 352. In this manner, the first fluid passage 351 is formed by utilizing the fixed cylindrical portion 94 being a part of the case 9 (refer to FIG. 3).

As shown in FIG. 3, the other end of the first fluid passage 351 is connected to the oil pump 78 through the control valve 70. The control valve 70 is switchable to a first position 71 and a second position 72 by a solenoid and a spring. The first position 71 has a path 73a enabling the fluid passage 35 and the oil pump 78 to communicate and a path 73b enabling the fluid passage 35 and an oil storage section 79 to communicate and having a throttle 73k. The second position 72 has a path 73c enabling the fluid passage 35 and the oil pump 78 to communicate and a path 73e enabling the fluid passage 35 and the oil storage section 79 to communicate. When the control valve 70 is switched by the control device 7 to the first position 71 with the oil pump 78 being in operation, the oil is supplied from a port 78a of the oil pump 78 to the hydraulic chamber 34 through the path 73a, the first fluid passage 351, the annular groove 352 and the piercing port 353, whereby the hydraulic chamber 34 is increased in pressure to move the piston 32 in the arrow F2 direction (refer to FIG. 3). The discharge of the oil in the fluid passage 35 to the oil storage section 79 is restricted by the throttle 73k.

When the control device 7 controls the oil pump 78 to be stopped and the control valve 70 to be switched to the second position 72, on the contrary, the hydraulic chamber 34 communicates with the oil storage section 79 through the first fluid passage 351, whereby the oil in the hydraulic chamber 34 is returned to the oil storage section 79 through the piercing port 353, the annular groove 352, the first fluid passage 351 and the path 73e. Since no throttle is provided on the path 73e, the discharge speed of the oil from the hydraulic chamber 34 can be increased. At this time, because responsiveness can be heightened in switching the clutch device 2 from the cutoff state to the connection state, the driving power of the engine 1 can be quickly transmitted to the transmission 6. Because of being of the motor-driven type as mentioned earlier, the oil pump 78 can supply oil in spite of whether the engine 1 is in operation or not. The control valve 70 and the oil pump 78 are equipped to be fixed on the outer circumferential side of the case 9.

Description will be added further. The aforementioned clutch device 2 is of a normally closed type, and at the ordinary time, the hydraulic chamber 34 is not filled with oil, and the adjoining friction plates 23 and separate plates 24 are held in engagement by being mutually pressure-contacted by the urging force of the springs 33, so that the clutch device 2 is brought into the connection state. As a result, the output shaft 10 of the engine 1 and the input shaft 60 of the transmission 6 are held in connection through the clutch device 2. When the engine 1 is in operation at this time, the output shaft 10 is rotated, and thus, the input member 20 is rotated. The friction plates 23 and the separate plates 24 held in the pressure-contacted state are rotated about the axis P1, the clutch drum 22 is rotated together with a rotor 82, whereby the input shaft 60 of the transmission 6 is rotated and hence, whereby the traveling wheels are rotated.

When the output shaft 10 of the engine 1 and the input shaft 60 of the transmission 6 are to be cut off, on the contrary, the driving of the oil pump 78 causes the oil to be supplied to the hydraulic chamber 34 through the fluid passage 35. When the pressurized oil in the hydraulic chamber 34 overcomes the urging force of the springs 33, the piston 32 is moved in the arrow F2 direction and is stopped upon contact with the piston stopper 229. At this time, since the separate plates 24 are movable in the arrow F2 direction, the adjoining friction plates 23 and separate plates 24 constructing the clutch device 2 separate from each other to be brought into a disengaged state being a non-pressure contact state, whereby the clutch device 2 is switched to the cutoff state. At this time, the connection between the output shaft 10 of the engine 1 and the input shaft 60 of the transmission 6 are cut off, so that the driving power of the output shaft 10 is not transmitted to the input shaft 60 of the transmission 6.

As shown in FIGS. 1-3, while the clutch device 2 is kept in the connection state, the hydraulic chamber 34 is narrowed in the space width in the direction along the axis P1 and is held to be large in the length in the radial direction, so that the hydraulic chamber 34 is made to be thin and flat. As the hydraulic chamber 34 is made to be flat in this way, the area of the pressured surface 32S on the piston 32 remains to be still larger though the capacity of the hydraulic chamber 34 is decreased at this time, so that the driving power of the piston 32 per unit supply quantity of the oil can be heightened. In this construction, when the hydraulic chamber 34 is supplied with the oil to switch the clutch device 2 from the connection state to the cutoff state, it becomes possible to increase the switching speed. Consequently, when the electric energy is to be regenerated by using the motor 8 as a generator, the responsiveness can be heightened in switching the clutch device 2 from the connection state to the cutoff state, and thus, the responsiveness in the regeneration control can be heightened. This contributes to increasing the storage quantity of electricity and further to improving the fuel efficiency of the vehicle.

According to the present embodiment, as the springs 33 for urging the piston 32, it is considered to use not the coil springs but leaf springs or washer springs. However, such leaf springs or washer springs are easy to change the spring load along about a curve of the second degree relative to the flection and has a high rate of change. In this case, an anxiety arises in that the torque capacity of the clutch device 2 cannot be secured when the friction plates 23 and the separates 24 constructing the clutch device 2 are subjected to aging or abrasion. If the spring load changes drastically, it becomes difficult to control the transmission torque by supplying the oil to the hydraulic chamber 34 and by controlling the pressurized oil in the hydraulic chamber 34. Where the springs 33 are coil springs as is the case of the present embodiment, on the contrary, the spring load changes almost linearly relative to the flection in comparison with leaf springs or washer springs. In this construction, an advantage can be obtained in being able to accurately control the transmission torque of the clutch device 2 by controlling the pressurized oil in the hydraulic chamber 34. Further, coil springs are advantageous in being arranged in a narrow space, and thus, a plurality of them can be arranged, so that a total spring load can be increased to contribute to maintaining the clutch device 2 with a large spring load in the connection state. However, as the case may be, the leaf springs or washer springs may be used without limiting the springs 33 to the coli springs.

As shown in FIG. 1, the motor 8 is provided on a driving power transmission path connecting the clutch device 2 with the transmission 6. The motor 8 has a stator 80 and the rotor 82. The stator 80 is secured on the inner circumferential side of the second case 92 and has exciting windings 80c wound around an iron core. The rotor 82 is coaxially arranged on the inner circumferential side of the stator 80 with a clearance 80x. Since the rotor 82 is connected on the outer circumferential side of the outer cylindrical portion 224 of the clutch drum 22, the rotor 82 and the clutch drum 22 bodily rotate about the axis P1. When exciting electric current is supplied to the exciting windings 80c of the stator 80, a rotational magnetic field is generated about the axis P1, the rotor 82 rotates, and the clutch drum 22 is rotated, whereby the input shaft 60 of the transmission 6 is rotated to rotate the traveling wheels of the vehicle through the transmission 6.

As shown in FIG. 1, the case 9 surrounds and accommodates the clutch device 2, the clutch operating mechanism 3, the motor 8, the torque converter 61 and the like. The case 9 has the first case 91, the second case 92 connected to the first case 91 and a third case 93 connected to the second case 92 in order from the engine 1 side. The first case 91 has a first wall 910 extended radially inward. The second case 92 has a second wall 920 extended radially inward. The inner circumferential part of the second wall 920 has the fixed cylindrical portion 94 extended along the axis P1. As show in FIG. 1, the stator 80 of the motor 8 is secured on the inner side of an outer wall cylindrical portion 92x of the second case 92. The first wall 910 and the second wall 920 are opposed to each other. Bearings 96a are interposed between the fixed cylindrical portion 94 of the second wall 920 and the fixed cylindrical portion 220 spline-fitted on the outer circumferential portion of the input shaft 60 of the transmission 6. Thus, the clutch drum 22 and the input shaft 60 can rotate bodily about the axis P1 relative to the fixed cylindrical portion 94 of the second case 92. The bearings 96a are engaged on the fixed cylindrical portion 94 on the case 9 side by means of an engaging member 96x. A bearing 96c is interposed between an inner circumferential portion of the first wall 910 of the first case 91 and the input member 20. Thus, the input member 20 can rotate about the axis P1 relative to the first case 91. A bearing 96e is interposed between the output shaft 10 and the shaft portion 201.

Within the aforementioned case 9, the clutch device 2 and the clutch operating mechanism 3 are coaxially arranged on the inner circumferential side of the motor 8. Consequently, it is possible to arrange the clutch device 2 and the clutch operating mechanism 3 on the inner circumferential side of the motor 8 by effectively utilizing the width D (refer to FIG. 1) of the motor 8 in the shaft lengthwise direction. This construction contributes to downsizing the dimension in the axis P1 direction.

Next, description will be added regarding the operation of the aforementioned hybrid vehicle drive device. When the driver steps on an accelerator pedal with an ignition switch (not shown) turned to ON (at the time of a small throttle opening), the motor-driven oil pump 78 using a battery as a power supply is operated, the pressurized oil is supplied to the hydraulic chamber 34 to bring the clutch device 2 into the cutoff state, and the electric current flows across the exciting windings 80c of the motor 8 to rotate the rotor 82. With the rotation of the rotor 82, the clutch drum 22 connected to the rotor 82 is rotated about the axis P1, whereby the traveling wheels are rotated through the transmission 6 to start the vehicle. It may occur that the engine 1 is not started and remains stopped when the vehicle starts in this way. In this occasion, the vehicle is started by the driving power of the motor 8 only. When the vehicle starts in this way, in response to commands from the control device 7, the oil pump 78 is operated to generate the pressurized oil, and the control valve 79 is switched to the first position 71 to supply the oil to the fluid passage 35 and the hydraulic chamber 34 through the path 73a at the first position 71 of the control valve 70. As a result, the pressurized oil in the hydraulic chamber 34 is increased to move the piston 32 in the arrow F2 direction, whereby the normally closed clutch device 2 is switched from the connection state to the cutoff state. At this time, the engine 1, the flywheel 14 and the like acting as loads are cut off from the motor 8 and the transmission 6, so that the capability of the vehicle in starting can be enhanced.

Even in a range that the engine efficiency is not satisfactory such as when the engine 1 is low or very low in load, it is preferable that the vehicle is travelled by the motor 8 only with the engine 1 stopped from being driven. When the driving of the engine 1 is stopped in this way, the normally closed clutch device 2 has been switched from the connection state to the cutoff state. At this time, the oil is supplied by the operation of the oil pump 78 to the hydraulic chamber 34 through the control valve 70 and the fluid passage 35, and the pressurized oil in the hydraulic chamber 34 overcomes the urging force of the springs 33 to move the piston 32 in the arrow F2 direction. Thus, the adjoining friction plates 23 and the separate plates 24 constructing the clutch device 2 separate from each other to bring about the disengaged state being the non-pressure contact state.

On the other hand, when the vehicle is accelerated or climbs a hill, it is preferable that the engine 1 be driven. At this time, when the acceleration pedal is stepped on and the throttle is opened to a predetermined opening degree or larger for acceleration or climbing the hill, a fuel injection system is operated and a spark plug is ignited. Further, the drive shaft of the starter motor (not shown) is driven. Thus, the ring gear 12 of the flywheel 14 meshing with the drive shaft of the starter motor is rotated together with the flywheel 14 and the output shaft 10, whereby the engine is started. When the engine 1 is driven in this way, the clutch device 2 is kept in the connection state. At this time, the valve 70 is switched to the second position 72, and the oil in the hydraulic chamber 34 is discharged to the oil storage section 79 through the fluid passage 35 and the path 73e at the second position 72 of the control valve 70. Thus, the urging force of the coil springs 33 overcomes the hydraulic force in the hydraulic chamber 34 to move the piston 32 in the arrow F1 direction together with the separate plates 24, whereby the adjoining friction plates 23 and separate plates 24 constructing the clutch device 2 are pressure-contacted and engaged with each other. As a result, the rotational driving power of the output shaft 10 of the engine 1 is transmitted to the input shaft 60 of the transmission 6 through the clutch device 2. Consequently, both of the driving powers of the engine 1 and the motor 8 are added to make the vehicle travel by a large driving power.

When the vehicle is in an ordinary traveling state, the engine efficiency is high, and therefore, it is preferable to stop electric supply to the motor 8 and to idle the motor 8. At this time, the clutch device 2 is kept in the connection state, and the driving power of output shaft 10 of the engine 1 is transmitted to the input shaft 60 of the transmission 6 through the clutch device 2, whereby the vehicle is propelled by the driving power of the engine 1.

When electric energy is to be regenerated such as when the vehicle is decelerated, the electric supply to the exciting windings 80c of the motor 8 is stopped, and the clutch device 2 is switched from the connection state to the cutoff state. Since the connection between the output shaft 10 of the engine 1 and the input member 20 of the clutch device 2 is released, the load exerted on the rotor 82 is decreased, so that the efficiency in regeneration is heightened. At this time, the oil is supplied by the oil pump 78 to the hydraulic chamber 34, and the pressurized oil in the hydraulic chamber 34 overcomes the urging force of the coil springs 33. Thus, the piston 32 is moved in the arrow F2 direction (refer to FIG. 3), whereby the adjoining friction plates 23 and separate plates 24 constructing the clutch device 2 separate from each other to bring about the disengaged state being the non-pressure contact state. When the electric energy is to be regenerated in this way, the motor 8 operates as a generator to generate electric energy. The generated electric energy is stored in the battery.

According to the present embodiment, because during the traveling of the vehicle, the clutch drum 22 is rotated together with the rotor 82 about the axis P1 and has a centrifugal force exerted thereon, it may occur that oil is left in the hydraulic chamber 34 even when the clutch device 2 is in the connection state. In this occasion, there is a risk that if the oil is left superfluously in the hydraulic chamber 34, a centrifugal force would cause a centrifugal hydraulic pressure to be produced in the hydraulic chamber 34, which would result in generating a pressuring force to pressure the piston 32 in the arrow F2 direction. At this time, the clutch device 2 which should have been kept in the connection state may be brought into the cutoff state in dependence on the conditions.

To this end, according to the present embodiment, as shown in FIG. 1, a singular or a plurality of check valves 37 are provided in the fixed plate 31 constituting a wall that defines the hydraulic chamber 34. The check valve 37 has a valve port 370 making the hydraulic chamber 34 communicate with the exterior of the same and a valve element 371 capable of opening and closing the valve port 370. The valve port 370 is formed to a taper shape to be large in diameter on the hydraulic chamber 34 side, and the valve element 371 is prevented from coming off. At the time of regeneration or the like, the oil is supplied to the hydraulic chamber 34 in order to cut off the connection between the output shaft 10 of the engine 1 and the input shaft 60 of the transmission 6. At this time, since the pressurized oil in the hydraulic chamber 34 is increased, the valve element 371 closes the valve port 370 to increase the boosted speed of the pressurized oil in the hydraulic chamber 34. Thus, the piston 32 is pressured in the arrow F2 direction, whereby the clutch device 2 can be quickly switched to the cutoff state. In this construction, the efficiency in regeneration can be heightened.

On the contrary, when the clutch device 2 is kept by the springs 33 in the connection state, it is preferable that the oil remaining in the hydraulic chamber 34 be discharged from the hydraulic chamber 34 to diminish the centrifugal hydraulic force as far as possible. This is because the centrifugal hydraulic force weakens the urging force of the springs 33. At this time, since the oil in the hydraulic chamber 34 is discharged by the operation of the control valve 70 to the oil storage section 79 side through the fluid passage 35, the closing force with which the valve element 371 closes the valve port 370 is weakened. At this time, the valve element 371 of the check valve 37 is moved by the centrifugal force on the large-diameter side of the taper-shaped valve port 370 to release the valve port 370, whereby the oil in the hydraulic chamber 34 can be discharged from the valve port 370 to the exterior of the hydraulic chamber 34. As shown in FIG. 1, because the valve port 370 of the check valve 37 faces the clutch device 2, the oil can be discharged from the valve port 370 toward the clutch device 2, so that the clutch device 2 can be further improved in cooling and lubrication. As shown in FIG. 1, because the check valve 37 is arranged on the outer circumferential side than the middle position in a direction orthogonal to the axis P1, the oil that is moved in the hydraulic chamber 34 in the centrifugal direction during rotation can be easily discharged from the valve port 370 of the check valve 37 to the exterior of the hydraulic chamber 34, so that the construction is advantageous in diminishing the centrifugal hydraulic force in the hydraulic chamber 34.

According to the present embodiment described above, as shown in FIG. 1, the clutch drum 22 has the drum chamber 230 surrounded by the clutch drum 22, the fixed plate 31 secured to the clutch drum 22 to be surrounded by the clutch drum 22, the piston 32 surrounded by the clutch drum 22 and partitioning the drum chamber 230 into the hydraulic chamber 34 and the spring chamber 39, and the springs 33 (urging elements) provided inside the spring chamber 39 to be surrounded by the clutch drum 22 and urging the piston 32 in the direction to bring the clutch device 2 from the cutoff state into the connection state. As described above, the fixed plate 31, the piston 32 and the springs 33 are built in the drum chamber 230 of the clutch drum 22. Thus, this construction is advantageous in downsizing the dimension in the shaft lengthwise direction in comparison with the construction that the springs are arranged outside the clutch drum 22 in series in the shaft lengthwise direction. Consequently, it becomes possible to contribute to shortening the dimensions of the input shaft 60 and the clutch drum 22 in the shaft lengthwise direction. As a result, the input shaft 60 and the clutch drum 22 can be restrained from deflecting in the circumferential direction. This results in effectively supporting the clutch drum 22 by the thrust bearing 209 held in the shaft lengthwise direction.

According to the present embodiment, as understood from FIG. 1, the springs 33, the piston 32, the fixed plate 31 and the separate plates 24 (the second clutch section) are built in the space surrounded by the outer cylindrical portion 224 of the clutch drum 22 in this order toward the clutch device 2 in the direction in which the axis P1 extends. This construction is advantageous in shortening the dimension of the present device in the shaft lengthwise direction in comparison with the form that the springs 33 are arranged outside the clutch drum 22 in series in the shaft lengthwise direction.

Further, as shown in FIG. 1, the clutch drum 22 has the fixed cylindrical portion 220, the inner cylindrical portion 222 and the outer cylindrical portion 224 which are mutually coaxially cylindrical, from the inner side toward the outer side in the radial direction (the direction orthogonal to the axis P1). As shown in FIG. 1, a ring-shaped bearing chamber 2s is defined by the fixed cylindrical portion 220, the first extended portion 221 and the inner cylindrical portion 222. The ring-shaped bearing chamber 2s coaxially fits the ring-shaped bearings 96a and the ring-shaped fixed cylindrical portion 94 therein. Thus, the clutch drum 22 is rotatably supported on the fixed cylindrical portion 94 of the case 9. Further, as shown in FIG. 1, the springs 33, the piston 32 and the fixed plate 31 are arranged in the ring-shaped drum chamber 230 defined by the inner cylindrical portion 222 and the outer cylindrical portion 224. In this way, in the clutch drum 22, the bearing chamber 2s and the drum chamber 230 which differ in function are juxtaposed in the radial direction. Thus, it can be realized to shorten the dimension of the clutch drum 22 in the shaft lengthwise direction. In this construction, an advantage is obtained in shortening the dimension of the present device in the shaft lengthwise direction. Further, the bearing chamber 2s is arranged on the inner side than the drum chamber 230 in the radial direction of the input shaft 60, and the drum chamber 230 is arranged on the outer side than the bearing chamber 2s in the radial direction of the input shaft 60. Thus, the hydraulic chamber 34 of the drum chamber 230 can be increased in the distance from the axis P1, and the capacity of the hydraulic chamber 34 can be increased, so that an advantage can be obtained in increasing the hydraulic force of the hydraulic chamber 34 that operates the clutch device 2 in the cutoff direction. Since the responsiveness in cutting off the clutch device 2 is heightened in this way, the engine serving as a load at the time of electric regeneration can be quickly cut off from the input shaft 60, so that the efficiency in regeneration can be heightened.

Further, as shown in FIG. 1, in the radial direction, the plurality of components such as the input shaft 60, the fixed cylindrical portion 220 of the clutch drum 22, the bearings 96a, the fixed cylindrical portion 94 of the case 9, the inner cylindrical portion 222 of the clutch drum 22, the piston 32 and the springs 33 built in the clutch drum 22, the outer cylindrical portion 224 of the clutch drum 22, the rotor 82 of the motor 8 and the starter 80 are juxtaposed in order from the axis P1 side. Thus, it can be further realized to shorten the dimension of the present device in the shaft lengthwise direction.

According to the present embodiment, as shown in FIG. 3, there is provided an oil supply portion 100 that functions as a liquid supply portion for supplying oil being a liquid for lubrication or cooling to at least one of the friction plates 23 and the separate plates 24 constituting the clutch device 2 when the friction plates 23 and the separate plates 24 are released from engagement or in the half-engagement state. The oil supply portion 100 has a function of supplying the oil supplied to the annular groove 352 of the fluid passage 35, to the friction plates 23 and the separate plates 24 of the clutch device 2 having been switched to the cutoff state when the hydraulic chamber 34 and the fluid passage 35 are increased in pressure.

Figure 5:
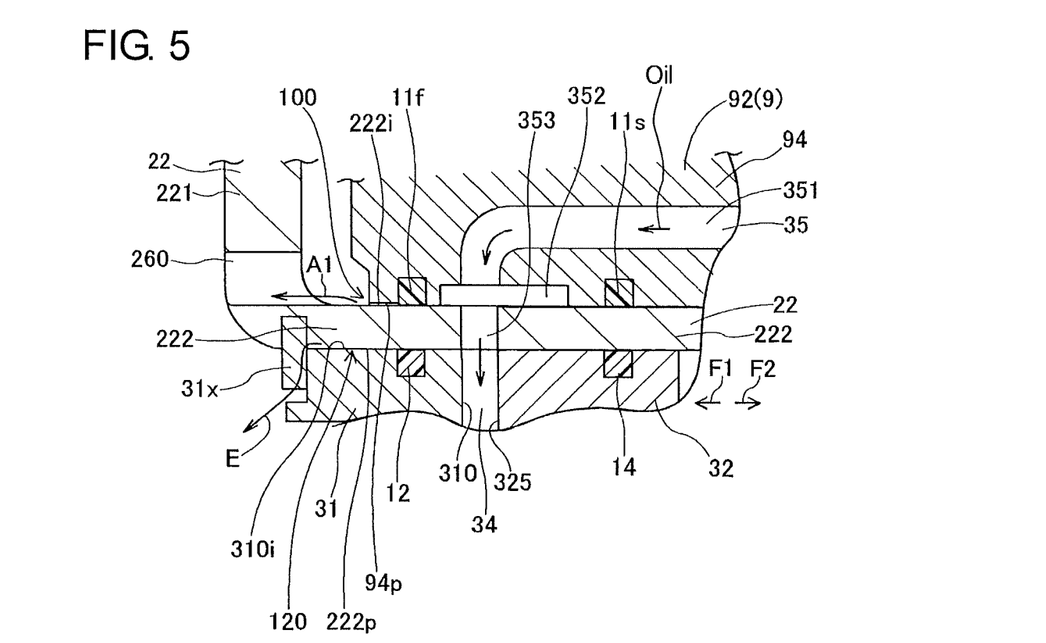
FIG. 5 relates to the first embodiment and is a fragmentary sectional view showing the neighborhood of an oil supply portion.

FIG. 5 shows FIG. 3 in an enlarged scale. As shown in FIG. 5, the oil supply portion 100 is formed as a minute clearance which exists between the outer circumferential surface 94p of the fixed cylindrical portion 94 of the second case 92 and the inner circumferential surface 222i of the inner cylindrical portion 222 of the clutch drum 22. Since the oil supply portion 100 exists to make a round of the axis P1, it can release the oil as equally as possible in the circumferential direction. As mentioned earlier, when the clutch device 2 is switched from the connection state to the cutoff state, the oil is supplied to the hydraulic chamber 34 and the fluid passage 35, whereby the hydraulic chamber 34 and the fluid passage 35 are increased in pressure. At this time, the oil supplied to the hydraulic chamber 34 and the fluid passage 35 leaks out from the oil supplied portion 100, further flows radially outward in the arrow A1 direction (refer to FIG. 3) past a lead passage 260 also serving to lighten the clutch drum 22, and further flows in the arrow A2 and A3 directions (refer to FIG. 3) to be supplied to the friction plates 23 and the separate plates 24. At this time, although the clutch device 2 has been switched to the cutoff state with the adjoining friction plates 23 and separate plates 24 sliding on each other, the oil can be adhered to the friction engaging surfaces of the friction plates 23 and the friction engaging surfaces of the separate plates 24, so that the friction engaging surfaces of the friction plates 23 and the friction engaging surfaces of the separate plates 24 are cooled by the oil to be restrained from falling in seizure.

According to the present embodiment in particular, in the course that the clutch device 2 is switched from the connection state to the cutoff state, the friction engaging surface of each friction plate 23 and the friction engaging surface of each separate plate 24 partly slid on each other with a minute clearance therebetween. In the mid course that the mutually facing plates 23, 24 separate from each other, there may arise a possibility that seizure takes place on the friction engaging surfaces because both of the friction engaging surfaces of the plates 23, 24 slid on each other in partial contact. Even in this situation, according to the present embodiment, when the hydraulic chamber 34 and the fluid passage 35 are increased in pressure, the oil (lubrication oil) supplied to the hydraulic chamber 34 and the fluid passage 35 leaks out from the oil supply portion 100 in the arrow A1 direction, flows radially outward in the arrow A2 and A3 directions through the lead passage 260 of the clutch drum 22, and further, can be supplied to the friction engaging surfaces of the friction plates 23 and the friction engaging surfaces of the separate plates 24. At this time, while the clutch device 2 is brought by the pressure increase in the hydraulic chamber 34 into the cutoff state, the oil can be supplied to the friction engaging surfaces of the adjoining friction plates 23 and separate plates 24, and the oil can be satisfactorily adhered to the friction engaging surfaces. In this construction, not only the friction engaging surfaces are cooled with the oil, but also the lubrication at the friction engaging surfaces can be satisfactorily secured even when both of the friction engaging surfaces slid on each other in partial contact, so that the seizure on the friction engaging surfaces can be suppressed.

As shown in FIG. 3, the extended portion 202 of the input member 20 of the clutch device 2 is formed with lead passages 262 which pierce therethrough in the thickness direction and also serve for reduction in weight. The lead passages 262 are formed to be plural in number with spaces in the circumferential direction of the extended portion 202 about the axis P1 and make the fixed plate 31 side and the first wall 910 side communicate with each other. Further, the holding portion 203 is formed with a plurality of lead passages 263 piercing therethrough in the thickness direction. The lead passages 262, 263 have the function of leading the oil from the oil supply portion 100 to the plates 23, 24 of the clutch device 2. Thus, although as shown in FIG. 3, the oil supply portion 100 is covered by the first extended portion 221 of the clutch drum 22 and the extended portion 202 of the input member 20 of the clutch device 2, the oil from the oil supply portion 100 can be supplied to the friction engaging surfaces of the friction plates 23 and the friction engaging surfaces of the separate plates 24. When the clutch device 2 is kept in the connection state, the oil is not positively supplied to the hydraulic chamber 34 and the fluid passage 35, and therefore, the hydraulic chamber 34 and the fluid passage 35 are not increased in pressure, so that the oil is not supplied from the oil supply portion 100 to the clutch device 2.

In addition, according to the present embodiment, as shown in FIG. 2, the rotor 82 and the stator 80 are coaxially arranged on the outer circumferential side of the friction plates 23 and the separate plates 24. Thus, the oil that cooled the friction plates 23 and the separate plates 24 is splashed by the centrifugal force or the gravity and comes to contact with the rotor 82 to cool the rotor 82. Further, the oil comes to contact with the stator 80 to cool the stator 80. Since the outer cylindrical portion 224 of the clutch drum 22 has engaging grooved openings 224p (refer to FIG. 3) which are formed at intervals in the circumferential direction of the outer cylindrical portion 224 and are engaged with the separate plates 24, the oil is easy to flow toward the rotor 82 and the windings 80c.

According to the present embodiment, as shown in FIG. 5, the oil supply portion 100 taking the clearance shape is formed between the inner circumferential surface 222i of the inner cylindrical portion 222 of the clutch drum 22 made of a metal and the outer circumferential surface 94p of the fixed cylindrical portion 94 made of a metal. At the oil supply portion 100, the oil from the fluid passage 35 is present for lubrication, and further, first seal members 11f, 11s are provided. The first seal member 11f and the first seal member 11s are provided at positions that put the annular groove 352 of the fluid passage 35 therebetween. Specifically, the first seal member 11f is formed on the clutch device 2 side relative to the annular groove 352, while the first seal member 11s is formed at the position that goes away from the clutch device 2 beyond the annular groove 352. The first seal members 11f, 11s are made of a sealing material (resin, rubber, sintered material or the like) and are formed to a C-ring shape about the axis P1. Thus, the oil properly leaks out from the annular groove 352 to the clearance-shape oil supply portion 100 but is restrained from leaking out excessively. This construction does not prevent the hydraulic chamber 34 from being increased in pressure and is able to quickly switch the clutch device 2 to the cutoff state, so that the efficiency in regeneration is not deteriorated.

Figure 6:
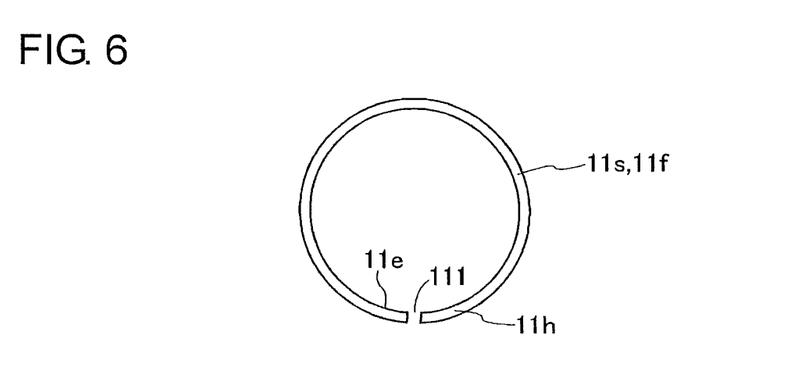
FIG. 6 relates to the first embodiment and is a plan view of a first seal member.

Further, description will be added. According to the present embodiment, as shown in FIG. 6, the first seal members 11f, 11s are made to be the same in shape and material and take a C-ring shape that has one end portion 11e and the other end portion 11h to form a cutout path 111. Thus, the cutout path 111 serves as a mark to suppress errors in fitting the first seal members 11f, 11s. Further, the first seal member 11f seals the oil but enables a part of the oil to pass through the cutout path 111 and thus, can efficiently supply the oil to the friction engaging surfaces of the friction plates 23 and the friction engaging surfaces of the separate plates 24. As mentioned earlier, the first seal members 11f, 11s provided for the clearance are the same in kind and are restrained from being assembled erroneously. However, the first seal member 11f arranged on the side close to the clutch device 2 is made to take the configuration that is enhanced in leaking out the oil by being formed to the C-ring shape, whereas the first seal member 11s arranged on the side far away from the clutch device 2 may be made to a shape that is little in oil leak, for example to an O-ring shape. In this case, the oil supplying from the oil supply portion 100 to the clutch device 2 is secured, and at the same time, the capability of increasing the pressure in the hydraulic chamber 34 can be heightened.

As shown in FIG. 3, a second seal member 12 is interposed between the inner circumferential surface of the fixed plate 31 and the outer circumferential surface of the inner cylindrical portion 222 of the clutch drum 22. A third seal member 13 is interposed between the outer circumferential surface of the fixed plate 31 and the inner circumferential surface of the piston 32. A fourth seal member 14 is interposed between the inner circumferential surface of the piston 32 and the outer circumferential surface of the inner cylindrical portion 222 of the clutch drum 22. Thus, the hydraulic chamber 34 is sealed. As the case may be, the second seal member 12 which is positioned on the clutch device 2 side relative to the hydraulic chamber 34 in the direction in which the axis P1 extends may be made not to the O-ring shape but to the C-ring shape. In this case, it can be expected that the oil is supplied from the clearance 120 formed between the inner circumferential surface 310i of the fixed plate 31 and the outer circumferential surface 222p of the inner cylindrical portion 222 of the clutch drum 22, to the clutch device 2 in the arrow E direction (refer to FIG. 5).

In addition, according to the present embodiment, as shown in FIG. 2, the oil storage section 79 serving as a liquid reservoir section for storing oil is formed at the bottom portions of the first case 91 and the second case 92. The oil storage section 79 operates as a reservoir storing the oil for the oil pump 78. The oil surface is indicated as 79x (refer to FIG. 2). The bottom portions of the stator 80, the windings 80c and the rotor 82 are immersed in the oil under the oil surface 79x of the oil storage section 79, and thus, the stator 80, the windings 80c and the rotor 82 can be cooled with the oil. In this construction, the efficiency of the motor or the efficiency in the generation of electricity can be heightened. As shown in FIG. 2, the oil surface 79x of the oil stored in the oil storage section 79 reaches the level that is on slightly inner circumferential side than the outer surface of the rotor 82 in the radial direction. Thus, the rotor 82 is restrained from being excessively immersed in the oil, so that when the rotor 82 rotates, the resistance against the rotation of the rotor 82 is prevented from becoming surplus, thereby contributing to improving the fuel efficiency.

Since the rotor 82 rotates when the motor 8 is operated, the rotor 82 can splash a part of the oil stored in the oil storage section 79 in the case 9 on the friction plates 23 and the separate plates 24 of the clutch device 2 being in the connection state and the cutoff state and further on elements such as the bearings 96 and the like. In this construction, further contributions can be made to cooling elements such as the friction plates 23, the separate plates 24, the bearings 96a, 96c and the like, as well as to enhancing the lubrication and the durability, so that contributions can be made to enhancing the efficiency of the motor or the efficiency in the generation of electricity.

As described above, according to the present embodiment, when the friction plates 23 and the separate plates 24 of the clutch device 2 are released from engagement, the friction engaging surfaces of the friction plates 23 and the friction engaging surfaces of the separate plates 24 separate from each other. At this time, the oil supply portion 100 supplies the oil to the friction engaging surfaces of the friction plates 23 and the friction engaging surfaces of the separate plates 24. Thus, the oil can be present on the both friction engaging surfaces of the friction plates 23 and the separate plates 24. Thus, the friction engaging surfaces of the friction plates 23 and the separate plates 24 are cooled and lubricated, and the seizure on the friction engaging surfaces can be suppressed.

In particular, when the friction engaging surfaces of the friction plates 23 and the friction engaging surfaces of the separate plates 24 separate from each other, it is feared that both friction engaging surfaces rub against each other if the clearance between the both friction engaging surfaces is a minute. Since even in this occasion, it is possible to make the oil supplied from the oil supply portion 100 present between the both friction engaging surfaces, the lubrication between the friction engaging surfaces can be secured to suppress the aforementioned rubbing. Consequently, the friction engaging surfaces of the friction plates 23 and the friction engaging surfaces of the separate plates 24 can be elongated in service life.

According to the present embodiment, when the oil is supplied to the hydraulic chamber 34 to switch the clutch device 2 from the connection state to the cutoff state, the hydraulic chamber 34 and the fluid passage 35 are increased in pressure. As a result, the oil supplied to the hydraulic chamber 34 and the fluid passage 35 can be effectively supplied to the friction engaging surfaces of the friction plates 23 and the separate plates 24 of the clutch device 2.

Further, according to the present embodiment, with the pressure increase in the hydraulic chamber 34 or the fluid passage 35, a part of the oil supplied to the hydraulic chamber 34 or the fluid passage 35 can be effectively flown out toward the friction engaging surfaces of the friction plates 23 and the friction engaging surfaces of the separate plates 24 through the cutout path 111 of the first seal member 11f. In this construction, it is possible to increase the pressure in the hydraulic chamber 34 and the fluid passage 35 thanks to the sealing operation of the first seal member 11f and at the same time, to effectively flow out the oil toward the friction engaging surfaces of the friction plates 23 and the friction engaging surfaces of the separate plates 24 through the cutout path 111 of the first seal member 11f.

According to the present embodiment, when the friction plates 23 and the separate plates 24 are released from engagement, the oil supply portion 100 can supply the oil to the friction plates 23 and the separate plates 24, and even when the friction plates 23 and the separate plates 24 are in the half-engagement state, the oil supply portion 100 can supply the oil to the friction plates 23 and the separate plates 24.

Second Embodiment

Figure 7:
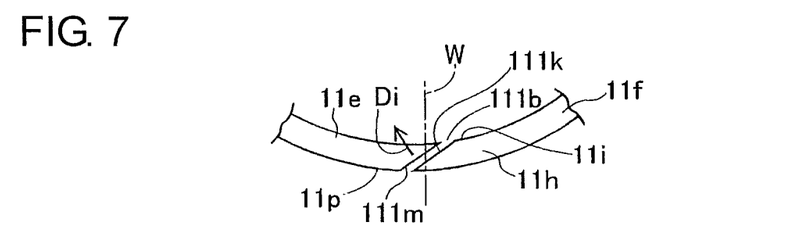
FIG. 7 relates to a second embodiment and is a view showing the neighborhood of a hollow portion of a first seal member.

FIG. 7 shows a second embodiment. The present embodiment is basically the same in operation and effect as the first embodiment. Hereinafter, description will be made mainly of the differences. As shown in FIG. 7, a first seal member 11f for leaking out oil from the clearance has a cutout path 111b. Where symbol W is assumed to indicate a virtual line extending in the radial direction across the center of the seal member 11f, the cutout path 111b is defined by oblique surfaces 111m, 111k obliquing relative to the virtual line W. When the oil passes through the cutout path 111b, the pressurized oil acts on the oblique surface 111m, and one end portion 11e having the oblique surface 111m can be displaced radially inward (in the arrow Di direction). In this construction, since the outer circumferential surface 11p of the one end portion 11e is displaced radially inward, the leak amount of the oil on the outer circumferential surface 11p side is easy to secure. Further, when the pressurized oil acts on the oblique surfaces 111m, 111k, the path width of the cutout path 111b is easy to increase. Thus, advantages can be obtained in that the first seal member 11f seals the oil and at the same time, is easy to make a part of the oil pass from the cutout path 111b toward the clutch device 2.

Third Embodiment

Figure 8:
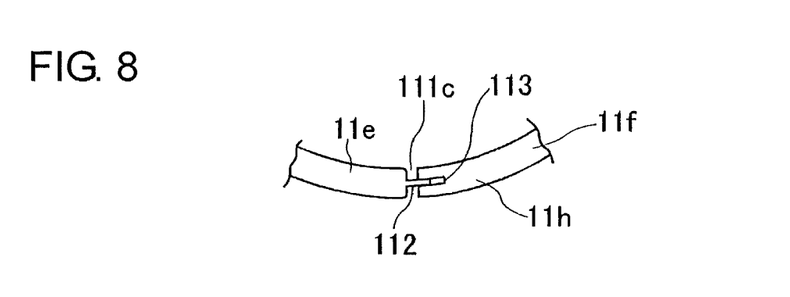
FIG. 8 relates to a third embodiment and is a view showing the neighborhood of a hollow portion of a first seal member.

FIG. 8 shows a third embodiment. The present embodiment is basically the same in operation and effect as the first and second embodiments. Hereinafter, description will be made mainly of the differences. As shown in FIG. 8, a first seal member 11f has a hollow portion 111c enabling oil to pass therethrough. One end portion 11e thereof has a protrusion 112 protruding in the circumferential direction. The other end portion 11h thereof has a slit 113 in which the protrusion 112 is fitted. Since the protrusion 112 is fitted in the slit 113, the hollow portion 111c is restrained from loosing its shape even at the time of a pressure increase in the hydraulic chamber 34, and therefore, it is easy to secure the leak amount of oil from the hollow portion 111c.

Fourth Embodiment

Figure 9:
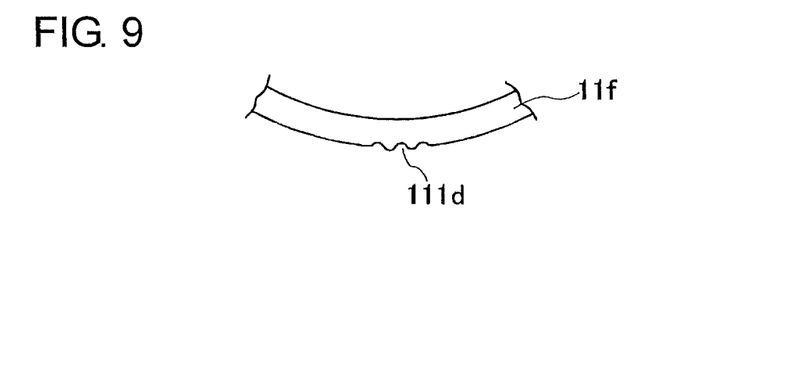
FIG. 9 relates to a fourth embodiment and is a view showing the neighborhood of hollow portions of a first seal member.

FIG. 9 shows a fourth embodiment. The present embodiment is basically the same in operation and effect as the foregoing embodiments. Hereinafter, description will be made mainly of the differences. As shown in FIG. 9, a first seal member 11f takes an O-ring shape. Hollow portions 111d enabling a part of oil to leak out are formed on a part of outer circumferential portion of the seal member.

Fifth Embodiment

Figure 10:
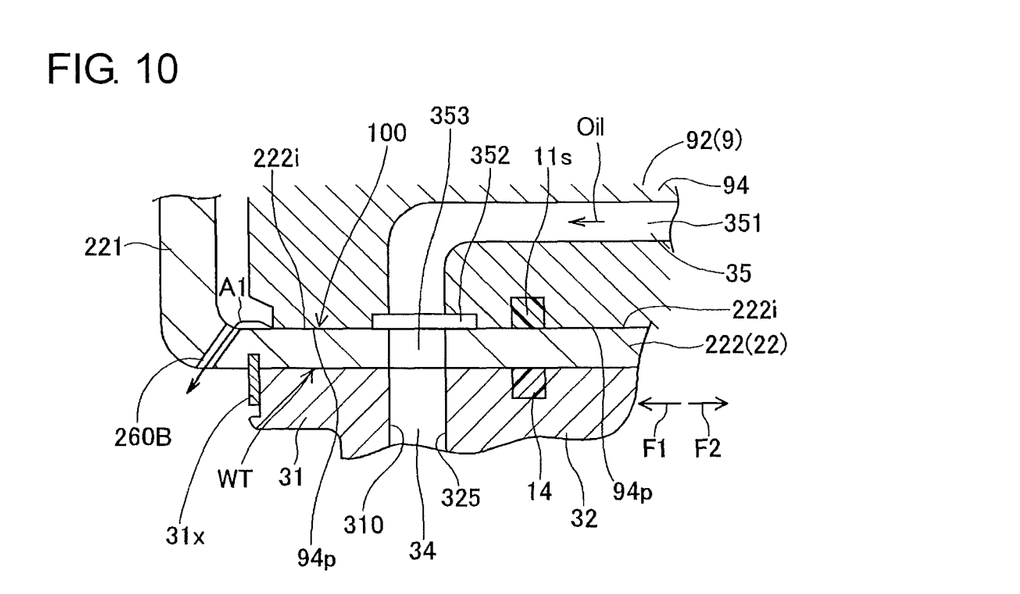
FIG. 10 relates to a fifth embodiment and is a fragmentary sectional view showing the neighborhood of an oil supply portion.

FIG. 10 shows a fifth embodiment. The present embodiment is basically the same in operation and effect as the foregoing embodiments. Hereinafter, description will be made mainly of the differences. As shown in FIG. 10, although the first seal member 11s is provided between the outer circumferential surface 94p of the fixed cylindrical portion 94 of the second case 92 and the inner circumferential surface 222i of the inner cylindrical portion 222 of the clutch drum 22, the first seal member is not provided at the clearance-shaped oil supply portion 100. In this case, the capability of supplying the oil from the oil supply portion 100 in the arrow A1 direction can be secured by properly setting the clearance. Further, the fourth seal member 14 is provided between the piston 32 and the inner cylindrical portion 222 of the clutch drum 22. However, the second seal member is not provided at an area WT between the inner cylindrical portion 222 of the clutch drum 22 and the fixed plate 31. As described above, in comparison with FIG. 5, the seal members 11f, 12 are not provided on the clutch device 2 side. Thus, although the oil is supplied from both of the oil supplied portion 100 and the area WT to the clutch device 2, it is possible to secure the capability of sealing the hydraulic chamber 34 by the seal members 11s, 14 and to increase the hydraulic chamber 34 in pressure, so that the clutch device 2 can be switched to the cutoff state. Further, as shown in FIG. 10, a lead passage 260B formed across the clutch drum 22 is formed to oblique radially outward as it goes toward the clutch device 2 side (toward the left in FIG. 10). Thus, the oil on which a centrifugal force acts can be made to pass through the lead passage 260B toward the clutch device 2.

Others

Although the foregoing first embodiment is applied to the hybrid vehicle having the engine 1 and the motor 8 in combination, it may be applied to a vehicle that is equipped with the engine 1 but not with the motor 8. The construction of the clutch operating mechanism 3 is not limited to the forgoing construction. In short, it may suffice to be of a construction that can switch the clutch device 2 to the connection state and the cutoff state. The first clutch section and the second clutch section of the clutch device 2 are not limited to taking the plate-like form, but may be of the construction that switches the cutoff and the connection of the power transmission between the engine 1 and the transmission 6. Therefore, the clutch sections may not be limited to the friction plates 23 and the separate plates 24, though being composed of the same. Although being made as a motor-driven type, the oil pump 78 may be a mechanical type driven by the engine 1 or the like without being limited to the motor-driven type. When the vehicle starts, the clutch device 2 is switched from the connection state to the cutoff state, and the vehicle starts by the driving power of the motor 8. However, without being limited thereto, the driving power of the engine 1 may be utilized besides the motor 8. Although the fluid passage 35 is a passage that performs both of supplying and discharging oil with respect to the hydraulic chamber 34, there may be taken, without being limited to the fluid passage 35, a construction that independently has a passage for supplying oil to the hydraulic chamber 34 and a passage for discharging oil from the hydraulic chamber 34. Without being limited to the coil springs, the springs 34 may be leaf springs or washer springs. The drum chamber 230 opens on the clutch device 2 side of the clutch drum 22, and the opening portion is closed by the fixed plate 31. However, without being limited to this construction, the drum chamber 230 may be opened on a side of the clutch drum 22 opposite to the clutch device 2, and this opening portion may be closed by the fixed plate 31. The present invention is not limited only to the embodiments described hereinabove and shown in the drawings and may be practiced in forms properly modified without departing from the gist. The following technical concepts can be grasped from the disclosure in the present description.

In the foregoing embodiments, the clutch device 2 and the clutch operating mechanism 3 are of a normally closed type.

However, they may be of a normally open type that the clutch device 2 is brought into the connection state by supplying the pressurized oil to the hydraulic chamber 34 of the clutch operating mechanism 3 by the oil pump 78 and is brought into the cutoff sate by connecting the hydraulic chamber 34 with the oil storage section 79.

The following technical concept can also grasped from the disclosure in the present description.

(Supplemental Note 1) A vehicle drive device comprising an engine having an output shaft; a transmission having an input shaft to which a driving power of the output shaft of the engine is transmitted, and connected to a wheel; a clutch device provided between the output shaft of the engine and the input shaft of the transmission, having a first clutch section provided on the output shaft side of the engine and a second clutch section provided on the input shaft side of the transmission, and being switchable to a connection state that the driving power of the engine is transmitted to the transmission through engagement between the first and second clutch sections and to a cutoff state that the engagement between the first and second clutch sections is released to cut off the transmission of the driving power; a clutch operating mechanism for switching the connection state and the cutoff state of the clutch device through the supply and discharge of liquid; and a liquid supply portion for leaking out the liquid supplied to the clutch operating mechanism to supply the fluid to at least one of the first and second clutch sections. In this construction, liquid for lubrication or cooling can be made to be present between the friction engaging surface of the first clutch section and the friction engaging surface of the second clutch section. This suppresses seizure on the friction engaging surface of the first clutch section and the friction engaging surface of the second clutch section. Thus, the clutch sections can be further enhanced in durability and elongated in service life.

(Supplemental Note 2) The vehicle drive device in the supplement note 1, wherein the clutch operating mechanism has a hydraulic chamber for generating a hydraulic force to switch the clutch device from the connection state to the cutoff state by being increased in pressure and a fluid passage connected to a liquid supply for supplying liquid to the hydraulic chamber and wherein the liquid supply portion leaks out the liquid from the hydraulic chamber and/or the fluid passage to supply the fluid to at least one of the first and second clutch sections when the hydraulic chamber is supplied with the fluid and is increased in pressure. In this construction, it is possible to make liquid for lubrication or cooling exist between the friction engaging surface of the first clutch section and the friction engaging surface of the second clutch section. Thus, the seizure on the friction engaging surface of the first clutch section and the friction engaging surface of the second clutch section can be suppressed. Thus, the clutch sections can be further enhanced in durability and elongated in service life.

Various features and many of the attendant advantages in the foregoing embodiments will be summarized as follows: According to the vehicle drive device in the first embodiment typically shown in FIGS. 1-3, the clutch drum 22 has the drum chamber 230 surrounded by the clutch drum 22; the fixed plate 31 surrounded by the clutch drum 22 and secured to the clutch drum 22 to close the opening of the drum chamber 230; the piston 32 surrounded by the clutch drum 22, partitioning the drum chamber 230 into the hydraulic chamber 34 for generating the hydraulic pressure that switches the clutch device 2 from the connection state to the cutoff state, and the spring chamber 39, and being movable along the axis P1; and the urging element 33 provided inside the spring chamber 39 to be surrounded by the clutch drum 22 and urging the piston 32 in a direction to bring the clutch device 2 from the cutoff state into the connection state. As mentioned above, the fixed plate 31, the piston 32 and the urging element 33 are assembled inside the clutch drum 22 to be surrounded by the clutch drum 22. Thus, an advantage is obtained in downsizing the present device in the shaft lengthwise direction. Particularly, in comparison with the case where the urging element 33 is assembled outside the clutch drum 22 in series, an advantage can be obtained in downsizing the present device in the shaft lengthwise direction.

Further, the clutch drum 22 comprises the cylindrical fixed portion 220 fixed to the outer circumferential portion of the input shaft 60; the first extended portion 221 extended radially outward from the fixed portion 220; the inner cylindrical portion 222 formed from the first extended portion 221 along the axis P1 of the input shaft 60; the second extended portion 223 extended radially outward from the inner cylindrical portion 222; and the outer cylindrical portion 224 formed from the second extended portion 223 along the axis P1 of the input shaft 60. The outer cylindrical portion 224, the inner cylindrical portion 222 and the second extended portion 223 partition the ring-shaped drum chamber 230. The fixed portion 220, the inner cylindrical portion 222 and the first extended portion 221 partition the ring-shaped bearing chamber 2s in which the bearing 96a rotatably supporting the clutch drum 22 is arranged. Since the drum chamber 230 and the bearing chamber 2s are juxtaposed in the radial direction of the input shaft 60, an advantage is obtained in downsizing the present device in the shaft lengthwise direction. Further, the bearing chamber 2s is arranged on the inner circumferential side than the drum chamber 230 in the radial direction of the input shaft 60, and the drum chamber 230 is arranged on the outer circumferential side than the bearing chamber 2s in the radial direction of the input shaft 60. Thus, the distance of the hydraulic chamber 34 in the drum chamber 230 from the axis P1 can be increased to increase the hydraulic chamber 34 in volume, so that an advantage can be obtained in increasing the hydraulic force of the hydraulic chamber 34 which can operate the clutch device 2 in the cutoff direction.

According to the vehicle drive device in the first embodiment typically shown in FIGS. 1-3, the urging element 33, the piston 32 and the fixed plate 31 are built in the space surrounded by the clutch drum 22 in this order toward the clutch device 2 in the direction in which the axis P1 extends. Since the urging element 33, the piston 32 and the fixed plate 31 are built in the clutch drum 22, an advantage is obtained in downsizing the present device in the shaft lengthwise direction. Particularly, in comparison with the case where a spring is assembled outside the clutch drum 22 in series, an advantage can be obtained in downsizing the present device in the shaft lengthwise direction.

According to the vehicle drive device in the first embodiment typically shown in FIGS. 1-3, the device further comprises the case 9 receiving the clutch drum 22 to surround the same. The case 9 has the wall 920 extended radially inward toward the input shaft 60 and the fixed cylindrical portion 94 provided on the wall 920 and extended along the axis P1 of the input shaft 60. The fixed cylindrical portion 94 rotatably supports the clutch drum 22 and has the flow passage 35 connected to the liquid supply 78 for supplying liquid to the hydraulic chamber 34. As described above, since the fixed cylindrical portion 94 has a function of supporting the clutch drum 22 on the case 9 as well as a function of forming the fluid passage 35, an advantage is obtained in downsizing the device.

According to the vehicle drive device in the first embodiment typically shown in FIGS. 1 and 4, the fixed plate 31 has the check valve 37 facing the clutch device 2, and the check valve 37 has the valve port 370 making the hydraulic chamber 34 communicate with the exterior for discharging the liquid that would produce a centrifugal hydraulic pressure, toward the clutch device 2 and the valve element 371 being able to open and close the valve port 370. During a high speed rotation of the input shaft 60, the centrifugal hydraulic pressure in the hydraulic chamber 34 would otherwise increase. At this time, an influence would be given on the urging force with which the urging element 33 urges the piston 32 in the direction to connect the clutch device 2. As a result, an anxiety arises in that responsiveness deteriorates in switching the clutch device 2 from the cutoff state to the connection state. Therefore, it is preferable to suppress the influence of the centrifugal hydraulic pressure in the hydraulic chamber 34 as far as possible by discharging the liquid existing in the hydraulic chamber 34 from the valve port 370. To this end, the liquid in the hydraulic chamber 34 that would produce the centrifugal hydraulic pressure is discharged from the valve port 370 of the check valve 37, and the centrifugal hydraulic pressure in the hydraulic chamber 34 is suppressed as far as possible. In this construction, the urging force with which the urging element 33 urges the piston 32 in the direction to connect the clutch device 2 is secured satisfactorily. Further, when the clutch device 2 is switched from the connection state to the cutoff state by increasing the pressure in the hydraulic chamber 34, the valve element 371 of the check valve 37 is closed with the pressure increase in the hydraulic chamber 34. At this time, the pressure increase speed in the hydraulic chamber 34 is secured, so that the clutch device 2 can be quickly switched from the connection state to the cutoff state. Where the present device is applied to the hybrid car which has the engine 1 and the motor 8 in combination, the engine 1 serving as a load at the time of electric regeneration can be quickly cut off from the transmission 6, so that the efficiency in regeneration can be enhanced.

According to the vehicle drive device in the first and fifth embodiments typically shown in FIGS. 3, 5 and 10, the device further comprises the liquid supply portion 100 for leaking out the liquid supplied to the clutch operating mechanism 3 to supply the fluid for lubrication or cooling to at least one of the first and second clutch sections 23, 24. Thus, it becomes possible to make liquid for lubrication or cooling exist between the friction engaging surface of the first clutch section 23 and the friction engaging surface of the second clutch section 24. Thus, the seizure on the friction engaging surfaces of the first and second clutch sections 23, 24 can be suppressed. Thus, the clutch sections 23, 24 can be further enhanced in durability and elongated in service life.

According to the vehicle drive device in the first and fifth embodiments typically shown in FIGS. 3, 5 and 10, the liquid supply portion 100 leaks out the liquid from the hydraulic chamber 34 an/or the fluid passage 35 to supply the liquid to at least one of the first and second clutch sections 23, 24 when the hydraulic chamber 34 is supplied with the liquid and is increased in pressure. At the time of a pressure increase, the liquid supply portion 100 supplies at least one of the first and second clutch sections 23, 24 with the liquid for lubrication or cooling. Thus, it is possible to make the liquid for lubrication or cooling exist between the friction engaging surface of the first clutch section 23 and the friction engaging surface of the second clutch section 24. Thus, the seizure on the friction engaging surfaces of the first and second clutch sections 23, 24 can be suppressed. Thus, the clutch sections 23, 24 can be further enhanced in durability and elongated in service life.

According to the vehicle drive device in the first embodiment typically shown in FIGS. 1, 2 and 4, the drive motor 8 useable as the generator is provided on the driving power transmission path connecting the clutch device 2 with the transmission 6, the drive motor 8 has the stator 80 and the rotor 82 rotating relative to the stator 80 and connected to the input shaft 60 of the transmission 6, the stator 80 and the rotor 82 are coaxially arranged on the outer circumferential side of the clutch device 2, and the liquid supplied to at least one of the first and second clutch sections 23, 24 is splashed toward the stator 80 and the rotor 82. The drive motor 8 useable as the generator is provided on the driving power transmission path connecting the clutch device 2 with the transmission 6. Thus, even when the driving power of the engine 1 is not transmitted to the input shaft 60 of the transmission 6 with the clutch device 2 having been switched to the cutoff state, the driving power of the drive motor 8 is transmitted to the input shaft 60 of the transmission 6 to rotate the input shaft 60. At this time, it is possible to make the vehicle travel by the rotational driving power of the drive motor 8 with the driving of the engine 1 held stopped. Further, since the stator 80 and the rotor 82 are coaxially arranged on the outer circumferential side of the clutch device 2, the liquid supplied to at least one of the first and second clutch sections 23, 24 can be splashed toward the stator 80 and the rotor 82. Accordingly, the stator 80 and the rotor 82 can be cooled and can be enhanced in durability.

According to the vehicle drive device in the first embodiment typically shown in FIGS. 3 and 5-9, the seal member 11f made of a sealing material is provided for sealing the liquid in the hydraulic chamber 34 or the fluid passage 35, and the seal member 11f has the passage 111, 111b, 111c or 111d which permits a part of the liquid supplied to the hydraulic chamber 34 and/or the fluid passage 35 to be supplied to at least one of the first and second clutch sections 23, 24 with a pressure increase in the hydraulic chamber 34. In this construction, with the pressure increase in the hydraulic chamber 34, the part of the fluid supplied to the hydraulic chamber 34 and/or the fluid passage 35 can be supplied toward at least one of the first and second clutch sections 23, 24 through the passage 111, 111b, 111c or 111d of the seal member 11f. The seizure of the clutch device 2 can be prevented in the construction simplified like this.

According to the vehicle drive device in the first embodiment typically shown in FIG. 2, the liquid storage section 79 storing liquid is provided, and when the rotor 82 of the drive motor 8 rotates, the rotor 82 splashes the liquid stored in the liquid storage section 79 on at least one of the first and second clutch sections 23, 24. In this construction, the fluid storage section 79 can store the liquid. When the drive motor 8 rotates, the rotor 82 can splash the liquid stored in the liquid storage section 79 on at least one of the first and second clutch sections 23, 24. Thus, the seizure of the first and second clutch sections 23, 24 can be further suppressed. In addition, the lubrication can be enhanced by splashing the liquid on the bearing 96a, 209, 96c or the like.

According to the vehicle drive device in the first embodiment typically shown in FIGS. 1-3, the first and second clutch sections 23, 24 are pressure-contacted by the pressing force of the piston 32 urged by the urging member 33. The pressure of oil supplied to the hydraulic chamber 34 causes the piston 32 to separate from the first and second clutch sections 23, 24 against the urging force of the urging member 33.

Further, the clutch drum 22 comprises the cylindrical fixed portion 220 fixed to the outer circumferential portion of the shaft-like member 60; the first extended portion 221 extended radially outward from the fixed portion 220; the inner cylindrical portion 222 formed from the first extended portion 221 along the axis P1 of the shaft-like member 60; the second extended portion 223 extended radially outward from the inner cylindrical portion 222; and the outer cylindrical portion 224 formed from the second extended portion 223 along the axis P1 of the shaft-like member 60. The outer cylindrical portion 224, the inner cylindrical portion 222 and the second extended portion 223 partition the ring-shaped drum chamber 230. The fixed portion 220, the inner cylindrical portion 222 and the first extended portion 221 partition the ring-shaped bearing chamber 2s in which the bearing 96a rotatably supporting the clutch drum 22 is arranged. Since the drum chamber 230 and the bearing chamber 2s are juxtaposed in the radial direction of the shaft-like member 60, an advantage is obtained in downsizing the present device in the shaft lengthwise direction. Further, the bearing chamber 2s is arranged on the inner circumferential side than the drum chamber 230 in the radial direction of the shaft-like member 60, and the drum chamber 230 is arranged on the outer circumferential side than the bearing chamber 2s in the radial direction of the shaft-like member 60. Thus, the distance of the hydraulic chamber 34 in the drum chamber 230 from the axis P1 can be increased to increase the hydraulic chamber 34 in volume, so that an advantage can be obtained in increasing the hydraulic force of the hydraulic chamber 34 which can operate the clutch device 2 in the cutoff direction.

INDUSTRIAL APPLICABILITY

The present invention is applicable to a vehicle drive device for a hybrid vehicle that has an engine and a drive motor in combination as vehicle driving sources, or a vehicle that has an engine but does not have a drive motor.

The invention claimed is:

1. A vehicle drive device comprising:
an engine having an output shaft;
a transmission to which a driving power of the output shaft of the engine is transmitted and which has an input shaft with an axis and is connected to a wheel;
a clutch device provided between the output shaft of the engine and the input shaft of the transmission, having a first clutch section provided on the output shaft side of the engine and a second clutch section provided on the input shaft side of the transmission, and being switchable to a connection state that the first and second clutch sections are engaged to transmit the driving power of the engine to the transmission, and a cutoff state that the engagement between the first and second clutch sections is released to cut off the transmission of the driving power; and
a clutch operating mechanism for switching the connection state and the cutoff state of the clutch device through the supply and discharge of a liquid; wherein:
the clutch operating mechanism comprises a clutch drum secured to the input shaft, supporting the second clutch section and having a drum chamber; a fixed plate surrounded by the clutch drum and secured to the clutch drum to close an opening of the drum chamber; a piston surrounded by the clutch drum, partitioning the drum chamber into a hydraulic chamber for generating a hydraulic pressure that switches the clutch device from the connection state to the cutoff state, and a spring chamber, the piston being movable along the axis; and an urging element provided inside the spring chamber and urging the piston to switch the clutch device from the cutoff state to the connection state, wherein the spring chamber is surrounded by the clutch drum;
the clutch drum comprises a cylindrical fixed portion fixed to an outer circumferential portion of the input shaft; a first extended portion extended radially outward from the fixed portion; an inner cylindrical portion formed from the first extended portion along the axis of the input shaft; a second extended portion extended radially outward from the inner cylindrical portion; and an outer cylindrical portion formed from the second extended portion along the axis of the input shaft and holding the second clutch section;
the outer cylindrical portion, the inner cylindrical portion and the second extended portion partition the drum chamber, wherein the drum chamber has a ring shape; and
the fixed portion, the inner cylindrical portion and the first extended portion partition a ring-shaped bearing chamber in which a bearing rotatably supporting the clutch drum is arranged, wherein the drum chamber and the bearing chamber are juxtaposed in a radial direction of the input shaft with the bearing chamber arranged on the inner circumferential side of the drum chamber in the radial direction of the input shaft.

2. The vehicle drive device in claim 1, wherein the urging element, the piston and the fixed plate are built in a space surrounded by the clutch drum in this order toward the clutch device in a direction in which the axis extends.

3. The vehicle drive device in claim 1, further comprising a case receiving the clutch drum to surround the clutch drum; wherein:
the case has a wall extended radially inward toward the input shaft and a fixed cylindrical portion provided on the wall and extended along the axis of the input shaft; and the fixed cylindrical portion rotatably supports the clutch drum and has a fluid passage connected to a liquid supply for supplying the liquid to the hydraulic chamber.

4. The vehicle drive device in claim 3, wherein the fixed plate has a check valve facing the clutch device, and wherein the check valve has a valve port making the hydraulic chamber communicate with an exterior for discharging the liquid toward the clutch device and a valve element being able to open and close the valve port.

5. The vehicle drive device in claim 1, further comprising a liquid supply portion for leaking out the liquid supplied to the clutch operating mechanism to supply the liquid to at least one of the first or second clutch sections.

6. The vehicle drive device in claim 5, wherein the liquid supply portion leaks out the liquid from at least one of the hydraulic chamber or a fluid passage to supply the liquid to at least one of the first or second clutch sections when the hydraulic chamber is supplied with the liquid and is increased in pressure.

7. The vehicle drive device in claim 1, wherein a drive motor useable as a generator is provided on a driving power transmission path connecting the clutch device with the transmission; and the drive motor has a stator and a rotor being rotatable relative to the stator and connected to the input shaft of the transmission; and
wherein the stator and the rotor are coaxially arranged on an outer circumferential side of the clutch device; and the liquid is supplied to at least one of the first or second clutch sections and is splashed toward the stator and the rotor.

8. The vehicle drive device in claim 1, wherein a seal member made of a sealing material is provided for sealing the liquid in the hydraulic chamber or a fluid passage; and wherein the seal member has a passage which permits a part of the liquid supplied to at least one of the hydraulic chamber or the fluid passage to be supplied to at least one of the first or second clutch sections with a pressure increase in the hydraulic chamber.

9. The vehicle drive device in claim 7, further comprising a liquid storage section for storing the liquid, wherein when the rotor of the drive motor rotates, the rotor splashes the liquid stored in the liquid storage section on at least one of the first or second clutch sections.

10. A vehicle drive device comprising:
an input member rotatably connected to a driving source;
a shaft-like member arranged on the same axis as the input member and connected to a transmission;
a first clutch section engaged with one of the input member and the shaft-like member movably along the axis;
a second clutch section arranged to be connectable and disconnectable alternately with the first clutch section and engaged with the other of the input member and the shaft-like member movably along the axis;
a clutch drum secured to the shaft-like member, supporting the second clutch section movably along the axis, and having a bottom portion;
a plate fixed to the clutch drum;
a piston supported in the clutch drum movably along the axis for pressing the first and second clutch sections;
a spring chamber partitioned and formed between one end portion of the piston and the bottom portion of the clutch drum;
an urging member provided in the spring chamber and urging the piston toward the first and second clutch sections; and
a hydraulic chamber partitioned and formed between the other end portion of the piston and the plate; wherein:
the first and second clutch sections are brought into pressure contact by a pressing force of the piston urged by the urging member;
the piston is separated by the pressure of oil supplied to the hydraulic chamber, from the first and second clutch sections against an urging force of the urging member;
the clutch drum comprises a cylindrical fixed portion fixed to an outer circumferential portion of the shaft-like member; a first extended portion extended radially outward from the fixed portion; an inner cylindrical portion formed from the first extended portion along the axis of the shaft-like member; a second extended portion extended radially outward from the inner cylindrical portion; and an outer cylindrical portion formed from the second extended portion along the axis of the shaft-like member and holding the second clutch section;
the outer cylindrical portion, the inner cylindrical portion and the second extended portion partition the drum chamber, wherein the drum chamber has a ring shape; and
the fixed portion, the inner cylindrical portion and the first extended portion partition a ring-shaped bearing chamber in which a bearing rotatably supporting the clutch drum is arranged, wherein the drum chamber and the bearing chamber are juxtaposed in a radial direction of the shaft-like member with the bearing chamber arranged on the inner circumferential side of the drum chamber in the radial direction of the shaft-like member.

* * * * *